United States Patent [19]
Laroche

[11] Patent Number: 5,717,768
[45] Date of Patent: Feb. 10, 1998

[54] PROCESS FOR REDUCING THE PRE-ECHOES OR POST-ECHOES AFFECTING AUDIO RECORDINGS

[75] Inventor: Jean Laroche, Aptos, Calif.

[73] Assignee: France Telecom, Paris, France

[21] Appl. No.: 726,469

[22] Filed: Oct. 4, 1996

[30] Foreign Application Priority Data

Oct. 5, 1995 [FR] France ................................. 95 11723

[51] Int. Cl.$^6$ ................................................. H04B 3/20
[52] U.S. Cl. ............................................ 381/66; 379/406
[58] Field of Search ............... 381/66, 94; 379/388–390, 379/406, 410–412

[56] References Cited

U.S. PATENT DOCUMENTS

| | | | |
|---|---|---|---|
| 3,786,188 | 1/1974 | Allen | 381/66 |
| 5,513,265 | 4/1996 | Hirano | 379/410 |
| 5,528,687 | 6/1996 | Tanaka et al. | 379/406 |

FOREIGN PATENT DOCUMENTS

| | | |
|---|---|---|
| 0 065 210 | 11/1982 | European Pat. Off. . |
| 2 052 128 | 1/1981 | United Kingdom . |

OTHER PUBLICATIONS

IEEE Transactions on Speech and Audio Processing, vol.3, n°1, Jan. 1995—"Evaluation of short–time spectral attenuation techniques for the restoration of musical recordings"— O. Cappe, J. Laroche—pp. 84–93.

Journal of the Audio Engineering Society, vol. 40, n° 10, Oct. 1992—"Restoration of old gramophone recordings"— Vaseghi S V et al—pp. 791–801.

Journal of the Audio Engineering Society, vol. 30, n° 4, Apr. 1982—"On disk–record echo phenomena"—O. Stephani— pp. 217–224.

IEEE International Conference on Acoustics, Speech and Signal Processing, vol. 4, Mar. 1992—"Low–delay frequency domain LMS algorithm"—O.A. Amrane et al—pp. 9–12.

Patent Abstracts of Japan, vol. 017, n° 378 (E–1398), Jul. 1993.

IEEE Communications Magazine, vol. 28, n° 1, Jan. 1990— "Echo cancellation and applications"—Murano K et al—pp. 49–55.

*Primary Examiner*—Curtis Kuntz
*Assistant Examiner*—Vivian Chang
*Attorney, Agent, or Firm*—Henderson & Sturm

[57] ABSTRACT

For various values of an integer p, short-term discrete Fourier transforms $X(p,k)$ and $X_\tau(p,k)$ of the audio signal shifted by pR samples and of the audio signal shifted by $pR+\tau$ samples are respectively calculated, R denoting a predetermined integer and $\tau$ denoting a time shift between the echo and the portion of signal which gave rise to it, a corrected signal is calculated in the frequency domain by nonlinear transformation of $X(p,k)$ taking account, for the various values of the frequency index k, of a value representative of an attenuation factor relating to the echo and of $X_\tau(p,k)$, and a short-term component of a corrected signal is calculated in the time domain by short-term inverse Fourier transform of the corrected signal in the frequency domain. The corrected signal in the time domain is then formed by weighted summation of its short-term components. Application to the digital reprocessing of analog recordings.

9 Claims, 6 Drawing Sheets

PROCESS FOR REDUCING THE PRE-ECHOES OR POST-ECHOES AFFECTING AUDIO RECORDINGS

BACKGROUND OF THE INVENTION

The invention relates to the field of the restoration of noise-affected audio recordings. It is of relevance to signals which have been recorded on any medium (magnetic tape, vinyl record, cylinder) and then sampled and stored on a computer medium.

Pre- and post-echoes constitute a defect commonly encountered in this type of signal. Pre- or post-echoes are very frequently encountered in analog recordings on a magnetic medium (tape, cassettes) and also on records, when a passage in which the signal is of low sound level precedes or follows a passage of high sound level. The presence, a few moments before a signal of high level, of a greatly attenuated copy of this signal, clearly audible if the useful signal at this moment is of low level, is referred to as pre-echo. Similarly, the presence a few moments after a signal of high level of a greatly attenuated copy of this signal, which may be audible if the useful signal is of low level at this moment, is referred to as post-echo.

Pre- and post-echoes stem, in the case of magnetic tapes, from the magnetization, through the backing of the tape, of one turn by the adjoining turns. In the case of recordings on vinyl record, the phenomenon stems from plastic modification of a groove through the engraving of the adjacent grooves.

In all of what follows, the term "echo" will denote either a pre-echo or a post-echo which it is desired to eliminate from an audio recording.

In the context of telecommunications, the rather similar problem of echo cancellation arises, the echo now being due to the round trip time for the path separating the talker from his opposite party across the communication system. However, the techniques used in the context of communications allow the echo to be attenuated only if the transmission channel can be identified in the absence of any useful signal, this not being the case in the context of audio recordings. Indeed, in order to apply the techniques used in communication, it would be necessary for the echo to be able to be heard entirely on its own, that is to say in the absence of any useful signal. In the context of audio recordings, the echoes are troublesome precisely when they are heard in the presence of a useful signal which should not be impaired.

The purpose of the present invention is to eliminate or greatly attenuate the pre-echoes and post-echoes affecting an audio recording, in the presence or absence of any useful signal, and to do so without impairing the latter.

SUMMARY OF THE INVENTION

The invention thus proposes a process for eliminating, from a first segment of a digitized audio signal, an attenuated replica of a portion of a second segment of the digitized audio signal, said portion of the second segment exhibiting a time shift with respect to said replica, this process comprising the following steps:

determining a value representative of an attenuation factor between said portion of the second segment and said replica for a plurality of values of a frequency index k;

for a plurality of values of an integer p, calculating respective short-term discrete Fourier transforms $X(p,k)$ and $X\tau(p,k)$ of the audio signal shifted by $pR$ samples and of the audio signal shifted by $pR+\tau$ samples, R denoting a predetermined integer at most equal to the length T of said short-term discrete Fourier transforms and $\tau$ denoting said time shift expressed as a number of samples, calculating a corrected signal in the frequency domain by nonlinear transformation of the short-term Fourier transform $X(p,k)$ taking account, for each of said plurality of values of the frequency index k, of the value representative of the attenuation factor and of the short-term Fourier transform $X_\tau(p,k)$, and calculating a short-term component of a corrected signal in the time domain by short-term inverse Fourier transform of the corrected signal in the frequency domain; and forming the corrected signal in the time domain by weighted summation of the short-term components thereof.

The nonlinear transformation used to calculate the corrected signal in the frequency domain $Y(p,k)$ is for example of the form:

$$Y(p,k) = X(p,k) \cdot f\left(g(k) \frac{|X_\tau(p,k)|}{|X(p,k)|}\right)$$

$g(k)$ denoting the value representative of the attenuation factor for the frequency index k, $f(.)$ denoting a decreasing real function, and $|.|$ representing the modulus of a complex number.

This process uses a simple model of echo production: the echo (pre- or post-) is simply an attenuated and time-shifted version of the signal of which it is the replica. The nonlinear attenuation technique based on the use of the Fourier transform exhibits the following advantages in particular: it makes it possible to obtain very good attenuation factors even in the presence of errors in the estimate of the delay $\tau$; it makes it possible to over-estimate the attenuation factor and to obtain a yet greater reduction in the echo; it does not impair the useful signal.

When the time shift is not known precisely a priori, its prior determination advantageously includes the following steps:

performing a discrete Fourier transform, of predetermined length N, of the first segment of the digitized audio signal in order to obtain a first function of the frequency domain;

performing a discrete Fourier transform of length N of the second segment of the digitized audio signal in order to obtain a second function of the frequency domain;

calculating a truncated correlation function between the first and second segments by inverse discrete Fourier transform of length N of a third function of the frequency domain taking the value $U(m)^* \cdot V_f(m)$ for each frequency index m for which $|U(m)| < g_{max} \cdot |V_f(m)|$ and the value 0 for the other frequency indices m, $U(m)$ and $V_f(m)$ respectively denoting the values for the frequency index m of the first and second functions of the frequency domain, $g_{max}$ denoting a predetermined coefficient, and $(.)^*$ representing the complex conjugate; and calculating the time shift from the value of an integer for which the modulus of said truncated correlation function exhibits a maximum.

It is thus possible to solve the problems raised by the presence of useful signals during the step for estimating the shift, by virtue of a method of estimation by filtering/correlation in the frequency domain.

The determination of the value representative of the attenuation factor advantageously includes the following steps:

obtaining an estimate of the attenuation factor; and increasing by a predetermined quantity said estimate in order to yield said representative value of the attenuation factor.

The estimate of the attenuation factor may be dependent on or independent of the frequency index k. The obtaining of this estimate can include the following steps:

for a plurality of values of an integer q, calculating respective short-term discrete Fourier transforms of length T U(q,k) and V(q,k) of the audio signal shifted by qR samples belonging to the first segment and of the audio signal shifted by qR+τ samples belonging to the second segment; and calculating the estimate of the attenuation factor via:

$$\hat{g}(k) = \frac{\sum_{q=0}^{Q-1} |U(q,k)| \cdot |V(q,k)|}{\sum_{q=0}^{Q-1} |V(q,k)|^2} \quad (1)$$

or, if the estimate $\hat{g}$ is independent of the frequency index k, via:

$$\hat{g} = \frac{\sum_{q=0}^{Q-1} \sum_{k=0}^{T-1} |U(q,k)| \cdot |V(q,k)|}{\sum_{q=0}^{Q-1} \sum_{k=0}^{T-1} |V(q,k)|^2} \quad (2)$$

where $Q=1+E[(n_f-n_d-T)/R]$ with $n_f-n_d$ denoting the length of the first segment and $E[.]$ representing the integer part.

The determination of the attenuation thus takes into account the method used in the subsequent echo elimination step. The attenuation factor is estimated by a method of minimization of the least squares type in the frequency domain.

DESCRIPTION OF PREFERRED EMBODIMENTS

Figure 1:
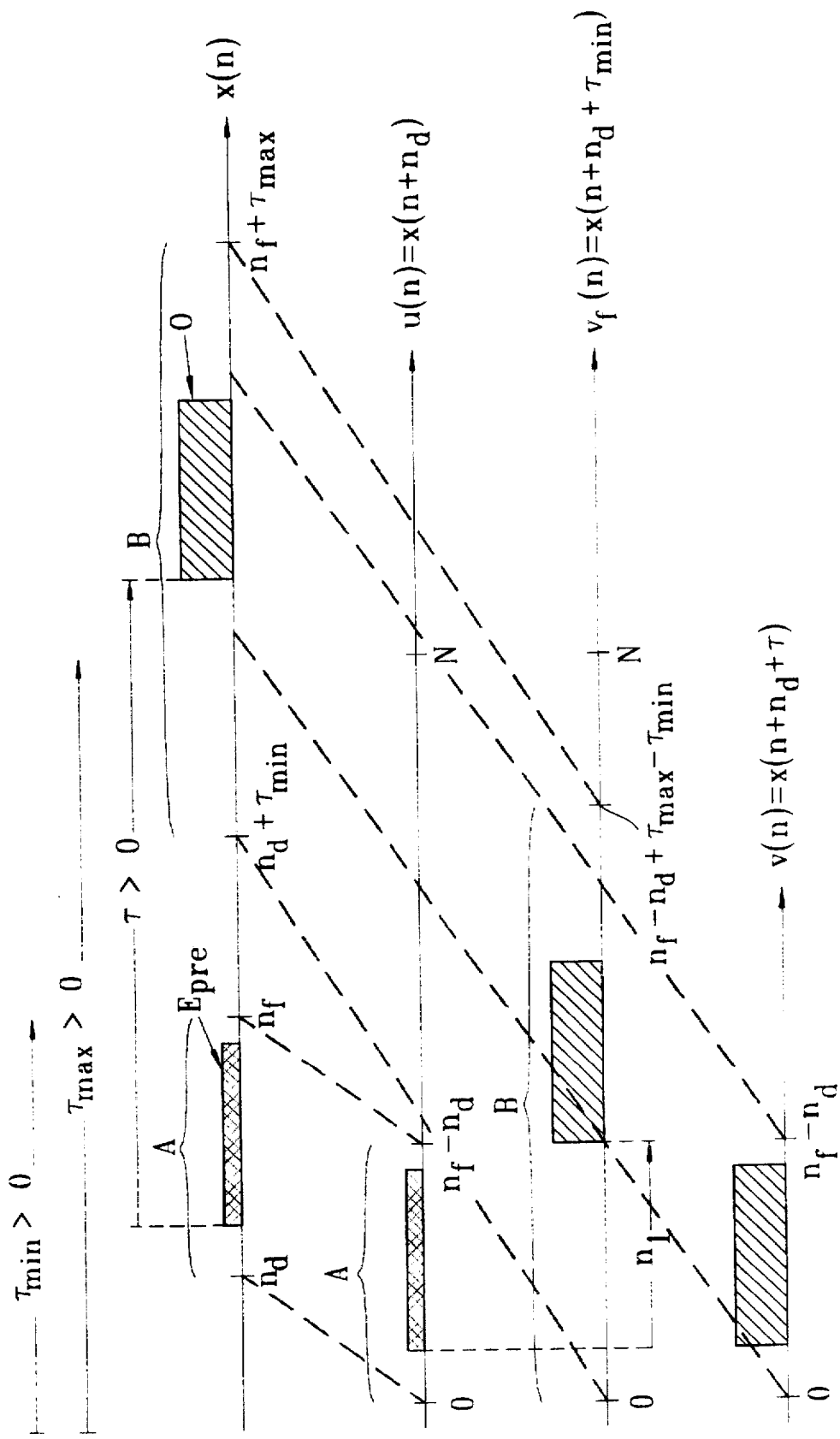
FIGS. 1 and 2 are timing diagrams of signals used in an example implementation of the process according to the invention, in the case of a pre-echo in FIG. 1 and of a post-echo in FIG. 2.
Figure 2:
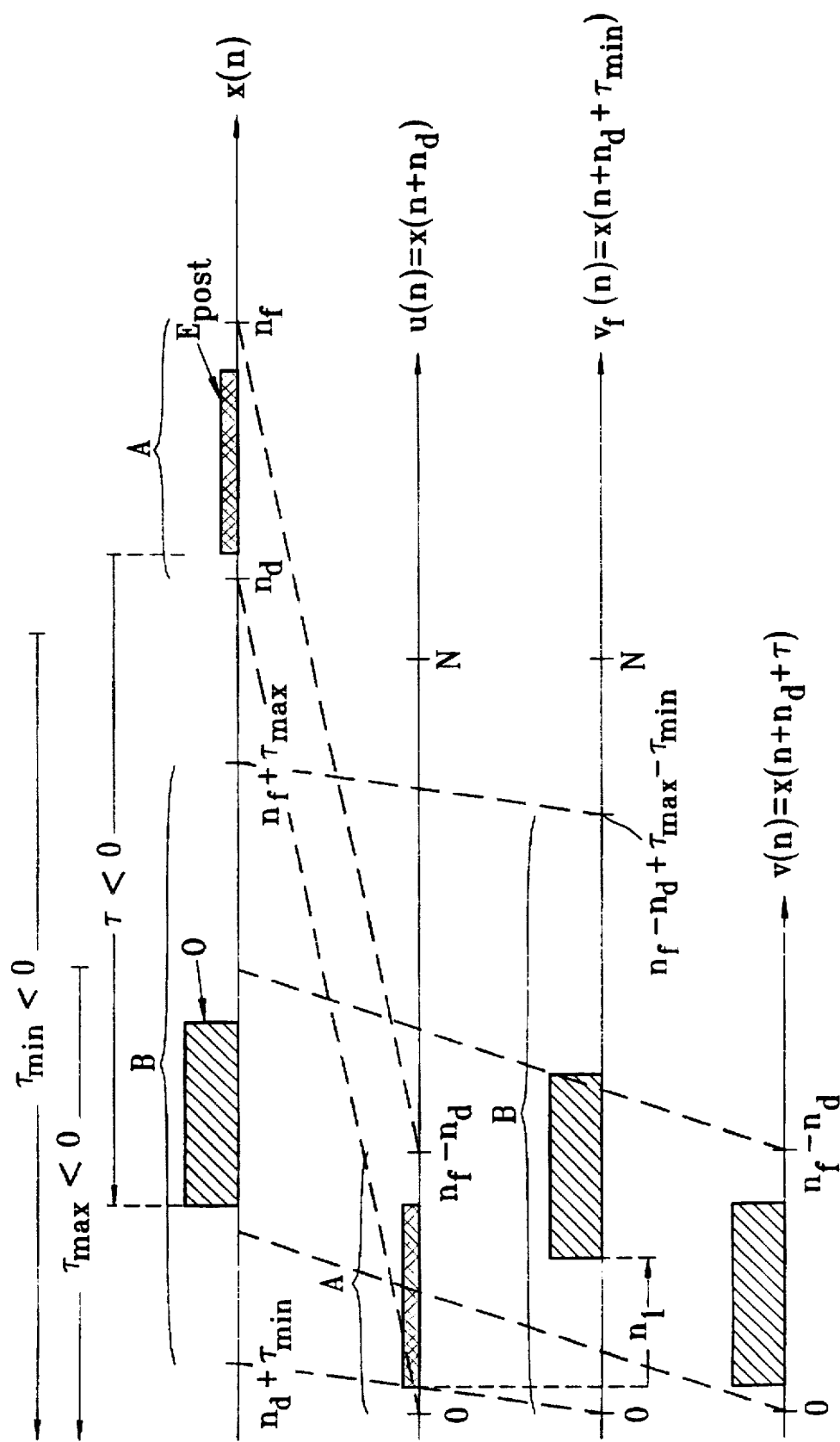

FIGS. 1 and 2 illustrate a section of an audio signal x(n) obtained by sampling and digitizing a recording affected by echoes. The sampling frequency $F_e$ is for example of 44.1 kHz. The signal x(n) is available in the form of a computer file which can be accessed by a computer programmed to implement the process according to the invention.

It is assumed that a first segment A containing an echo $E_{pre}$, $E_{post}$ and a second segment B, one portion O of which is the "original" of which this echo is a replica, have already been located. Such locating is readily performed aurally. Since the unwanted echo is clearly audible, the operator can pinpoint instants (samples $n_d$ and $n_f$) bracketing the echo, which will constitute the start and end of the segment A. Having picked out the echo, the operator can recognize and locate the original O in the same way. It is also possible to perform automatic locating of the segments in which echoes and their originals are liable to be found, for example by analysing the energy levels of the signal so as to mark the soft passages preceded or followed by loud passages. The locating of the segments need not be precise in order for the process according to the invention to work.

The locating of the segments A and B makes it possible to furnish the following initial data: start and end samples $n_d$, $n_f$ of the first segment A, minimum and maximum values $\tau_{min}$, $\tau_{max}$ of the time shift between the echo and the original, expressed in terms of number of samples. The start and end samples of the second segment B correspond to $n_d+\tau_{min}$ and $n_f+\tau_{max}$. The actual shift τ is then such that $0<\tau_{min}<\tau<\tau_{max}$ in the case of a pre-echo (FIG. 1), and $\tau_{min}<\tau<\tau_{max}<0$ in the case of a post-echo (FIG. 2).

Figure 3:
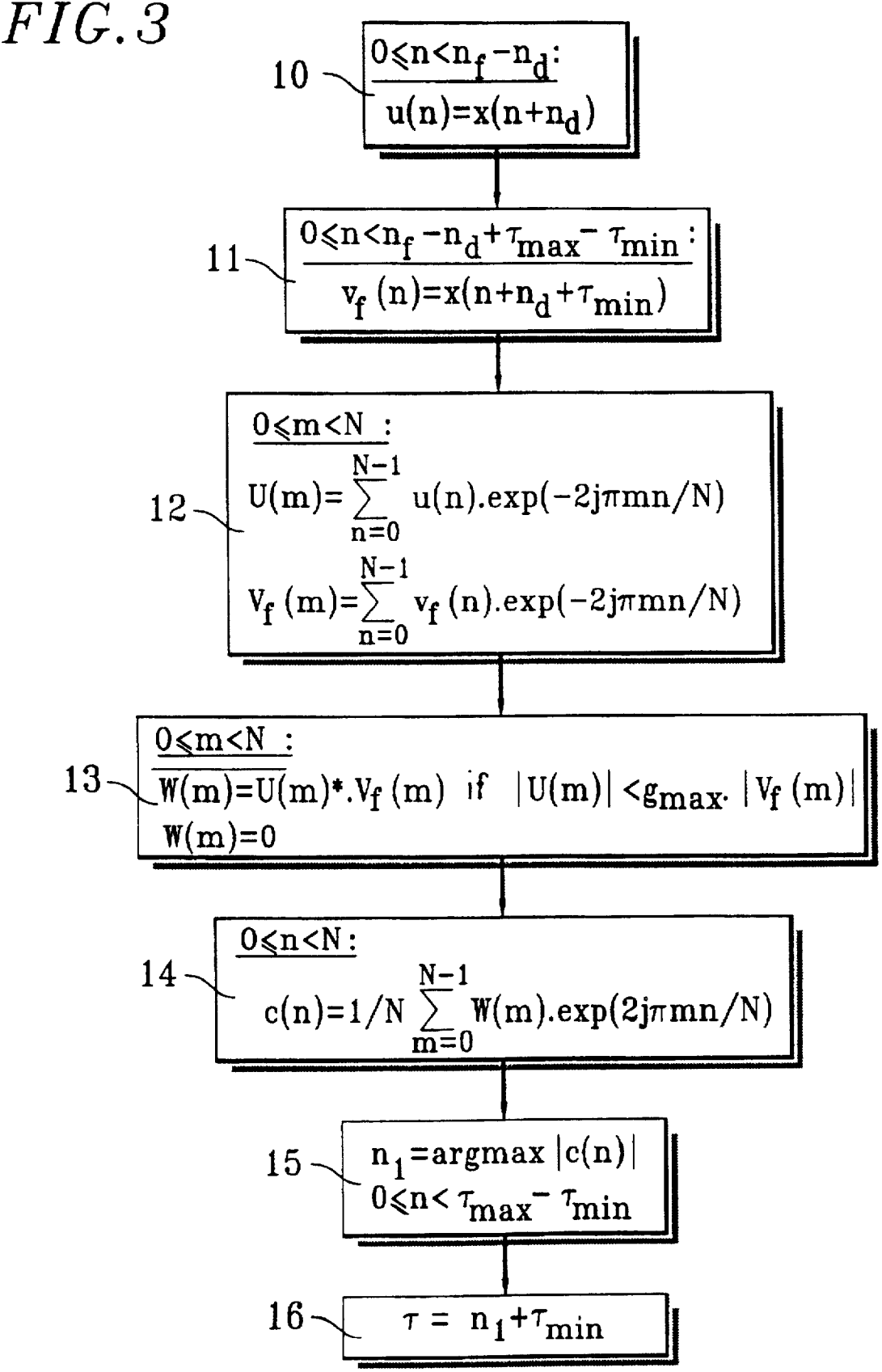
FIGS. 3 to 5 are flow charts respectively of procedures for determining the time shift, for determining the value representative of the attenuation factor and for eliminating the echo, which can be used for the implementation of the process.

When the shift τ is not known a priori (the case of a recording on magnetic tape for example), the first phase of the process according to the invention consists in determining it. FIG. 3 shows a procedure which can be used for this purpose. The first two steps 10, 11 consist in transferring the signals of the first and second segments A, B to a time window N samples long over which their discrete Fourier transforms will be calculated in step 12. For optimal implementation by fast Fourier transform (FFT), it is expedient to take the length N in the form of a power of 2, for example $N=2^a$, with $a=1+E[log_2(n_f-n_d+\tau_{max}-\tau_{min})]$ where $E[.]$ denotes the integer part, so that N is greater than or equal to the lengths $n_f-n_d$ and $n_f-n_d+\tau_{max}-\tau_{min}$ of the segments A and B.

Thus, the signals u and $v_f$ illustrated in FIGS. 1 and 2 are defined in steps 10 and 11:

$u(n)=x(n+n_d)$ if $0 \leq n < n_f-n_d$ $u(n)=0$ if $n_f-n_d \leq n < N$ $v_f(n)=x(n+n_d+\tau_{min})$ if $0 \leq n < n_f-n_d+\tau_{max}-\tau_{min}$ $v_f(n)=0$ if $n_f-n_d+\tau_{max}-\tau_{min} \leq n < N$ In step 12, a conventional FFT algorithm is used to calculate the discrete Fourier transforms of length N U(m) and $V_f(m)$ of the first and second segments A, B, that is to say, for $0 \leq m < N$:

$$V_f(m) = \sum_{n=0}^{N-1} v_f(n) \cdot \exp(-2j\pi mn/N)$$

$$U(m) = \sum_{n=0}^{N-1} u(n) \cdot \exp(-2j\pi mn/N)$$

The next step 13 is a thresholding operation in the frequency domain. In the frequency zones in which $|U(m)|$ is relatively high (that is to say greater than the maximum level at which it would be expected to be found having regard to an envisageable maximum attenuation and to the level of the signal $|V_f(m)|$ which generated the echo), the useful signal is regarded as of greater energy than the echo. This frequency zone is therefore not to be taken into account in estimating the time shift since it is not necessarily representative of the echo signal. The operation carried out in step 13, which is comparable to a temporal filtering separating the echo from the useful signal, is then, for $0 \leq m < N$:

$$W(m) = U(m)^* \cdot V_f(m) \quad \text{if } |U(m)| < g_{max}|V_f(m)|$$

$$W(m) = 0 \quad \text{if } |U(m)| \geq g_{max}|V_f(m)|$$

where $g_{max}$ represents a predetermined coefficient equal to a maximum expected attenuation factor. A typical order of magnitude for the choice of $g_{max}$ corresponds to an attenuation of the order of −30 dB.

In step 14 the inverse discrete Fourier transform of the function W(m) of the frequency domain is performed in order to obtain a truncated correlation function c(n) between the first and second segments A, B. This correlation function is truncated in the sense that the function W(m) has been set to zero in step 13 for those frequency zones in which the signal of the first segment is regarded as too energetic relative to that of the second segment as the representative of an echo. The inverse discrete Fourier transform of length N can also be performed in step 14 by an FFT algorithm, so as to obtain, for $0 \leq n < N$:

$$c(n) = \frac{1}{N} \sum_{m=0}^{N-1} W(m) \cdot \exp(2j\pi mn/N)$$

In step 15, the integer $n_1$ is sought for which the modulus of the truncated correlation function c(n) is a maximum in the interval $0 \leq n < \tau_{max} - \tau_{min}$. The function c(n) is generally real, and the maximum of its modulus generally corresponds to a positive real, so that it is possible to dispense with the calculation of the moduli |c(n)|. The actual time shift $\tau$ is then obtained in step 16 from the value of the integer $n_1$ obtained in step 15. With the conventions adopted in the example embodiment described, the shift $\tau$ is simply obtained by $\tau = n_1 + \tau_{min}$.

This manner of estimating the time shift $\tau$ by means of a correlation calculation involving filtering in the frequency domain allows reliable estimation through the use of information available a priori about the maximum value $g_{max}$ of the attenuation factor.

When the time shift $\tau$ is known a priori, the estimation procedure illustrated by FIG. 3 may be dispensed with. This is the case for example for an audio frequency signal stemming from a recording on a v rpm vinyl record: the shift $\tau$ can then be obtained in an elementary way via $\tau = E[F_e/(v/60)]$.

Figure 4:
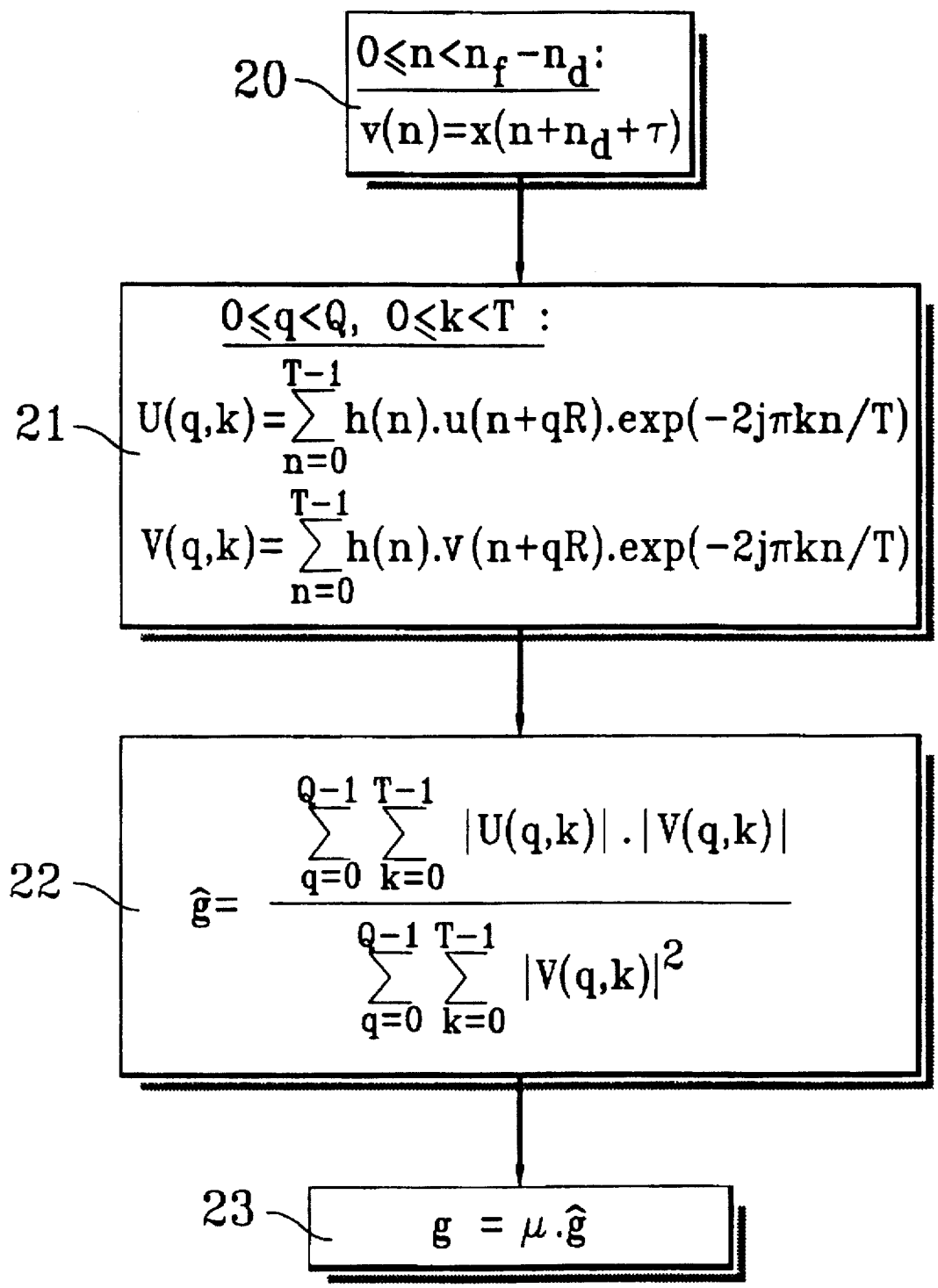

The second phase of the process according to the invention consists in determining a value g representative of the attenuation factor between the original O and its echo $E_{pre}$ or $E_{post}$. Considered below, with reference to FIG. 4, is the case of a single value g independent of frequency to represent the attenuation factor.

The obtaining of the value g includes firstly a calculation of an estimate $\hat{g}$ of the attenuation factor (steps 20 to 22), and then a step 23 of overestimating the estimated attenuation factor. In step 23 it is thus possible to take $g = \mu \cdot \hat{g}$, the predetermined coefficient $\mu$ corresponding for example to a gain of 3 or 5 dB.

Short-term Fourier transforms T samples long are used for estimation 20–22 of the attenuation factor $\hat{g}$. An analysis window L samples long is defined, corresponding for example to a duration of the order of 40 ms: $L = F_e \times 0.04$. This duration can be adjusted depending on the type of audio signal processed. The analysis window is conventionally associated with a windowing function h(n), for example a rectangular function or alternatively a Hamming function such that:

$$h(n) = [1 - \cos(2\pi n/L)]/2 \text{ for } 0 \leq n < L$$

$$h(n) = 0 \text{ for } n < 0 \text{ and } n \geq L$$

The length T of the short-term Fourier transform can be taken equal to the length L of the analysis window. For optimal implementation via an FFT algorithm, it is expedient to take T in the form of a power of 2: $T = 2^b$ with $b = 1 + E[\log_2 L]$. From the value of T, an increment factor R is defined, equal to at most T, for example $R = T/4$.

The first step 20 of the estimation of the attenuation consists in temporally aligning the first segment A containing the echo $E_{pre}$, $E_{post}$ with the corresponding portion of the second segment B containing the original O. A shifted signal v(n) is thus defined by:

$$v(n) = x(n + n_d + \tau) \text{ for } 0 \leq n < n_f - n_d$$

$\tau$ being the previously determined value of the time shift ($\tau < 0$ for a pre-echo and $\tau > 0$ for a post-echo). It may be seen in FIGS. 1 and 2 that, in the signals u(n) and v(n), the echo and its original are temporally aligned.

The short-term Fourier transforms are calculated in step 21. More precisely, Q pairs of short-term Fourier transforms are calculated, Q being the integer defined by $Q = 1 + E[(n_f - n_d - T)/R]$. Thus, for each integer q such that $0 \leq q < Q$, the FFT algorithm makes it possible to obtain two functions U(q,k) and V(q,k) of the frequency domain ($0 \leq k < T$):

$$U(q,k) = \sum_{n=0}^{T-1} h(n) \cdot u(n + qR) \cdot \exp(-2j\pi kn/T)$$

$$V(q,k) = \sum_{n=0}^{T-1} h(n) \cdot v(n + qR) \cdot \exp(-2j\pi kn/T)$$

The estimate $\hat{g}$ is then calculated in step 22 by applying formula (2). It is noted that this formula takes account only of the moduli of the short-term Fourier transforms U(q,k) and V(q,k).

If it is chosen to model the echo by a frequency-dependent attenuation factor, the flow chart of FIG. 4 can be modified in a straightforward way as regards steps 22 and 23. In the modified step 22, T estimates of the attenuation factor $\hat{g}(k)$ dependent on the frequency index k ($0 \leq k < T$) are calculated according to formula (1); and in the modified step 23, we take $g(k) = \mu \cdot \hat{g}(k)$ for $0 \leq k < T$ (it would also be possible to take a frequency-dependent overestimation factor $\mu$).

Figure 5:
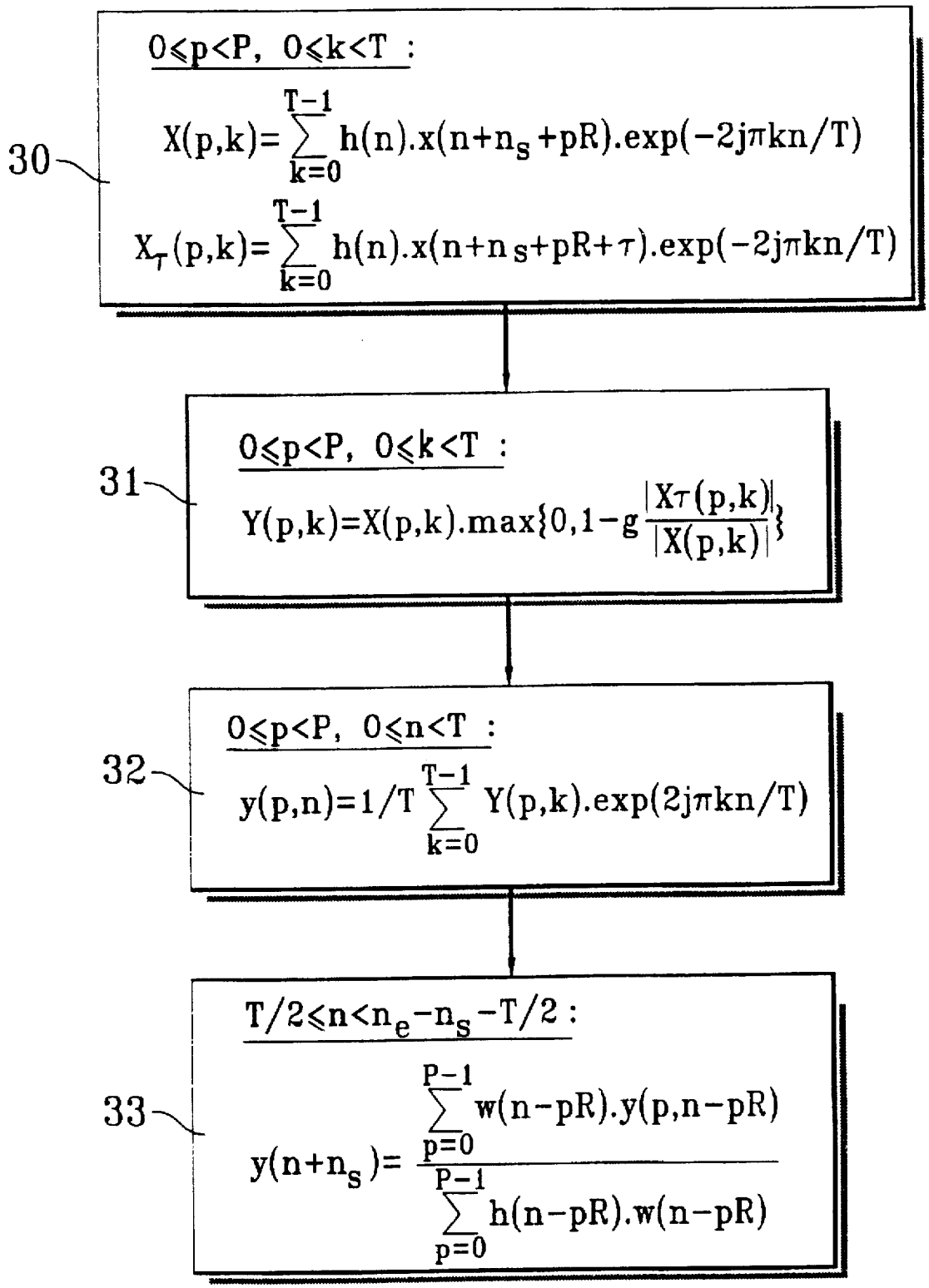

The last phase of the process consists in the elimination proper of the echo, for example according to the nonlinear spectral subtraction procedure illustrated in FIG. 5.

Firstly the zone to be processed is defined; as previously, it may be the time interval $n_d \leq n < n_f$, but it may also be longer (possibly the whole recording if the attenuation factor and the time shift are regarded as not changing over time). This zone is delimited by the samples numbered $n_s$ and $n_e$. The integer P is then defined by $P = 1 + E[n_e - n_s - T)/R]$.

In step 30, P pairs of short-term Fourier transforms X(p,k), $X_\tau$(p,k), of length T, are calculated. For each integer P such that $0 \leq p < T$, an FFT algorithm makes it possible to obtain the two functions of the frequency index k ($0 \leq k < T$):

$$X(p,k) = \sum_{n=0}^{T-1} h(n) \cdot x(n + n_s + pR) \cdot \exp(-2j\pi kn/T)$$

$$X_\tau(p,k) = \sum_{n=0}^{T-1} h(n) \cdot x(n + n_s + pR + \tau) \cdot \exp(-2j\pi kn/T)$$

In step 31, a nonlinear transformation is applied to the short-term Fourier transform X(p,k) to obtain a corrected signal in the frequency domain Y(p,k), and this is done for each integer p such that $0 \leq p < P$. This nonlinear transformation takes account, for the various values of the frequency index k, of the value g(k) or g representative of the attenuation factor and of the short-term Fourier transform $X_\tau(p,k)$. More precisely, the corrected signal Y(p,k) is expressed in the form:

$$Y(p,k) = X(p,k) \cdot f\left(g(k) \frac{|X_\tau(p,k)|}{|X(p,k)|}\right)$$

f being a positive, decreasing real function which introduces the nonlinearity. Such a transformation affects the modulus but not the argument of X(p,k). Step 31 represented in FIG. 5 corresponds to the case in which the attenuation factor is chosen to be independent of frequency (g(k)=g=Const) and to the choice f(z)=max{0, 1−z}. It will be noted that various other forms could be adopted for the function f, for example $f(z)=(\max\{0, 1-z^2\})^{1/2}$.

In step 32, P short-term components y(p,n) of a corrected signal are formed in the time domain by short-term inverse discrete Fourier transform of the corrected signals Y(p,k) in the frequency domain. For $0 \leq p < P$, the FFT algorithm thus makes it possible to obtain the signal y(p,n) of time index n ($0 \leq n < T$):

$$y(p,n) = \frac{1}{T} \sum_{k=0}^{T-1} Y(p,k) \cdot \exp(2j\pi kn/T)$$

Figure 6:
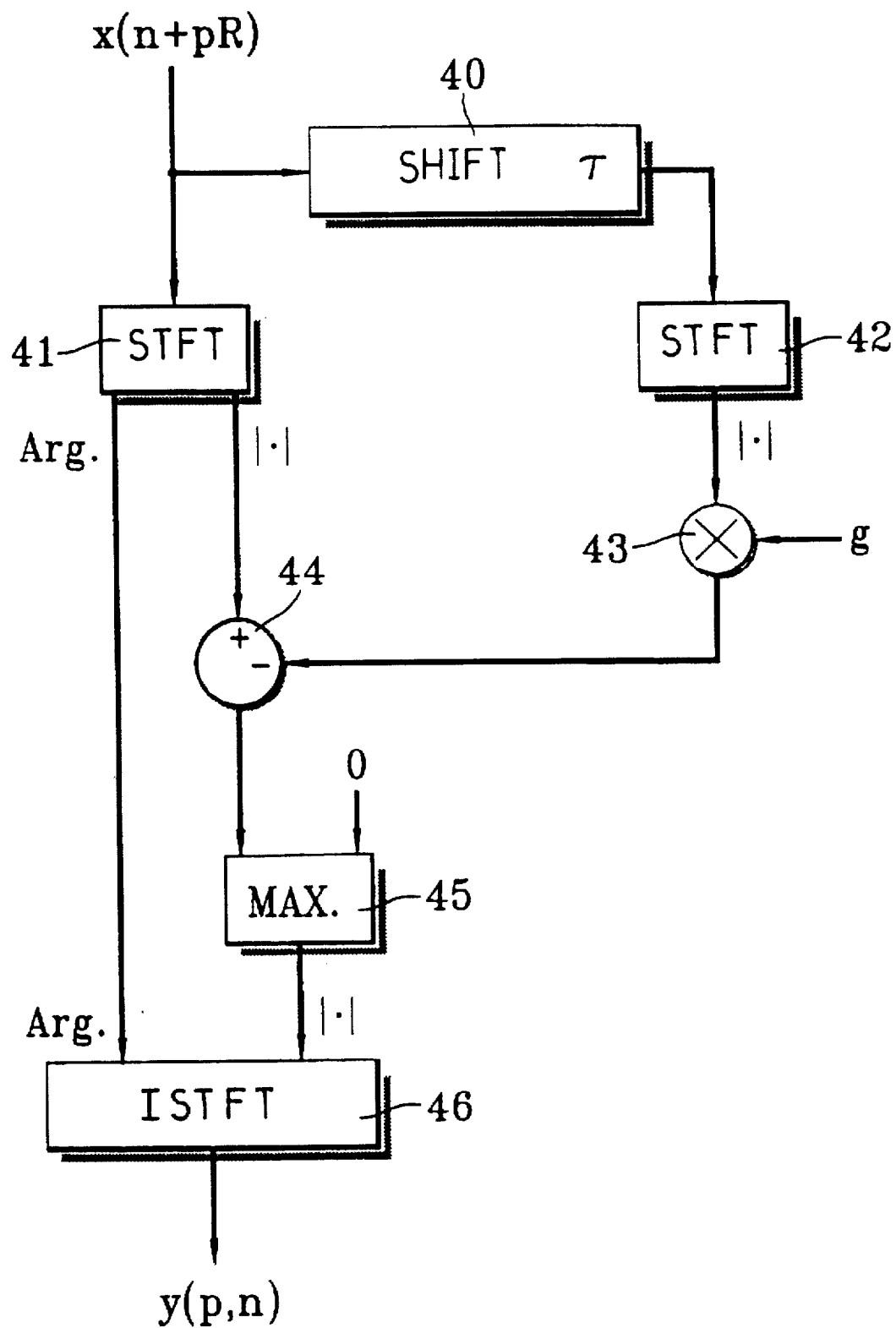
FIG. 6 is a schematic representation of one part of the echo elimination procedure represented in FIG. 5.

It is noted that steps 30 to 32, represented separately in FIG. 5, may be executed within one and the same loop over the integer p ranging from 0 to P-1. The operations corresponding to an iteration within this loop are illustrated in block diagram form in FIG. 6. Blocks 41 and 42 represent the short-term Fourier transforms (STFT) of the signal x(n+pR) and of the same signal shifted by τ samples at 40 (step 30 of FIG. 5 for one value of p). The multiplier block 43 applies the factor g to the modulus of Xτ(p,k), and the result is subtracted from the modulus of X(p,k) by the subtractor block 44. Block 46 represents the short-term inverse Fourier transform (ISTFT) applied to the corrected complex signal Y(p,k) whose argument is the same as that of X(p,k) and whose modulus is the greater, delivered by block 45, of 0 and the output from the subtractor block 46. Blocks 43 to 45 correspond to step 31 of FIG. 5 for one value of p, and block 46 to step 32.

In the final step 33, the corrected signal is formed in the time domain y(n) by weighted summation of its short-term components y(p,n). This is an overlap sum (overlap-add) which can be expressed, for $T/2 \leq n < n_e - n_s - T/2$, by:

$$y(n+n_s) = \frac{\sum_{p=0}^{P-1} w(n-pR) \cdot y(p, n-pR)}{\sum_{p=0}^{P-1} h(n-pR) \cdot w(n-pR)}$$

In this expression, w(n) denotes a synthesis windowing function of length L (that is to say zero outside the interval $0 \leq n < L$), such as a rectangular or Hamming function.

The signal $y(n+n_s)$ is the restored version of the signal $x(n+n_s)$, in which the echo has been eliminated or at least substantially attenuated.

This echo attenuation procedure using a nonlinear short-term spectral subtraction technique has the advantage of working even if the shift τ is estimated only approximately, and even if the attenuation factor is overestimated. Overestimating g (step 23) makes it possible to further improve the attenuation.

Multiple pre-echoes or post-echoes may be observed in certain rare cases. For example, this is the case if one turn of a magnetic tape corrupts several neighbouring turns. Such a situation can be handled by executing several times in succession the routine corresponding to FIGS. 4 and 5, once for each individual shift. It is also possible to handle such a situation in a single iteration. In the example in which there are two shifts τ and 2τ, it is possible to obtain two values (or two sets of values) $g_\tau$ and $g_{2\tau}$ in steps 22, 23, provided that the short-term Fourier transforms V'(q,k) of the doubly shifted signal $v'(n)=x(n+n_s+2\tau)$ were calculated on completion of steps 20 and 21. The corrected signal in the frequency domain Y(p,k) is then obtained, in the modified step 31, via $$Y(p,k) = X(p,k) \cdot f\left(g_\tau \frac{|X_\tau(p,k)|}{|X(p,k)|}, g_{2\tau} \frac{|X_{2\tau}(p,k)|}{|X(p,k)|}\right)$$

with $$X_{2\tau}(p,k) = \sum_{n=0}^{T-1} h(n) \cdot x(n+n_s \cdot pR + 2\tau) \cdot \exp(-2j\pi kn/T)$$

obtained in the modified step 30 and, for example, $f'(z,z') = \max\{0, 1-z-z'\}$.

In the case in which the time shift is constant (for example for a 33 rpm record, but not for a magnetic tape), and in which the attenuation factor is also regarded as being constant over time, the entire signal can be processed without impairing the useful signal, that is to say $n_s$ and $n_e$ can correspond to the start and end of the complete recording.

I claim:

1. Process for eliminating, from a first segment of a digitized audio signal, an attenuated replica of a portion of a second segment of the digitized audio signal, said portion of the second segment exhibiting a time shift with respect to said replica, said process comprising the steps of:

determining a value representative of an attenuation factor between said portion of the second segment and said replica for each of a plurality of values of a frequency index k;

for each of a plurality of values of an integer p, calculating respective short-term discrete Fourier transforms X(p, k) and $X_\tau$(p,k) of the audio signal shifted by pR samples and of the audio signal shifted by pR+τ samples, R denoting a predetermined integer at most equal to a length T of said short-term discrete Fourier transforms and τ denoting said time shift expressed as a number of samples, calculating a corrected signal in the frequency domain by nonlinear transformation of the short-term Fourier transform X(p,k) taking account, for each of said plurality of values of the frequency index k, of the value representative of the attenuation factor relating to said replica and of the short-term Fourier transform Xτ(p,k), and calculating a short-term component of a corrected signal in the time domain by short-term inverse Fourier transform of the corrected signal in the frequency domain; and forming the corrected signal in the time domain by weighted summation of the short-term components thereof.

2. Process according to claim 1, wherein said nonlinear transformation essentially affects the modulus but not the argument of the short-term Fourier transform X(p,k).

3. Process according to claim 2, wherein, for each value of the integer p, the corrected signal in the frequency domain Y(p,k) is calculated according to $$Y(p,k) = X(p,k) \cdot f\left( g(k) \frac{|X_t(p,k)|}{|X(p,k)|} \right)$$

g (k) denoting the value representative of the attenuation factor for the frequency index k, and f(.) denoting a decreasing real function.

4. Process according to claim 1, further including a preliminary step of determining the time shift, which comprises:

performing a discrete Fourier transform, of predetermined length N, of the first segment of the digitized audio signal in order to obtain a first function of the frequency domain;

performing a discrete Fourier transform of length N of the second segment of the digitized audio signal in order to obtain a second function of the frequency domain;

calculating a truncated correlation function between the first and second segments by inverse discrete Fourier transform of length N of a third function of the frequency domain taking the value $U(m)^* \cdot V_f(m)$ for each frequency index m for which $|U(m)| < g_{max} \cdot |V_f(m)|$ and the value 0 for the other frequency indices m, U(m) and $V_f(m)$ respectively denoting the values for the frequency index m of the first and second functions of the frequency domain, and $g_{max}$ denoting a predetermined coefficient; and calculating the time shift from the value of an integer for which the modulus of said truncated correlation function exhibits a maximum.

5. Process according to claim 1, wherein the determination of the value representative of the attenuation factor for a frequency index k includes the steps of:

obtaining an estimate of the attenuation factor; and increasing by a predetermined quantity said estimate in order to yield said representative value of the attenuation factor.

6. Process according to claim 5, wherein the obtaining of the estimates of the attenuation factor for the plurality of values of the frequency index k includes the steps of:

for each of a plurality of values of an integer q, calculating respective short-term discrete Fourier transforms of length T U(q,k) and V(q,k) of the audio signal shifted by qR samples belonging to the first segment and of the audio signal shifted by qR+τ samples belonging to the second segment; and calculating the estimate ĝ(k) of the attenuation factor for each frequency index k via:

$$\hat{g}(k) = \frac{\sum_{q=0}^{Q-1} |U(q,k)| \cdot |V(q,k)|}{\sum_{q=0}^{Q-1} |V(q,k)|^2}$$

where $Q=1+E[(n_f-n_d-T)/R]$ with $n_f-n_d$ denoting the length of the first segment and $E[.]$ representing the integer part.

7. Process according to claim 1, wherein one and the same value representative of the attenuation factor is adopted for each of the values of the frequency index k.

8. Process according to claim 7, wherein the determination of the value representative of the attenuation factor includes the steps of:

obtaining an estimate of the attenuation factor; and increasing by a predetermined quantity said estimate in order to yield said representative value of the attenuation factor.

9. Process according to claim 8, wherein the obtaining of the estimate of the attenuation factor includes the steps of:

for each of a plurality of values of an integer q, calculating respective short-term discrete Fourier transforms of length T U(q,k) and V(q,k) of the audio signal shifted by qR samples belonging to the first segment and of the audio signal shifted by qR+τ samples belonging to the second segment; and calculating the estimate ĝ of the attenuation factor by:

$$\hat{g} = \frac{\sum_{q=0}^{Q-1} \sum_{k=0}^{T-1} |U(q,k)| \cdot |V(q,k)|}{\sum_{q=0}^{Q-1} \sum_{k=0}^{T-1} |V(q,k)|^2}$$

where $Q=1+E[(n_f-n_d-T)]/R$ with $n_f-n_d$ denoting the length of the first segment and $E[.]$ representing the integer part.

* * * * *